US012785994B2

(12) United States Patent
Xu et al.

(10) Patent No.: US 12,785,994 B2
(45) Date of Patent: Nov. 3, 2026

(54) METHOD AND SYSTEM FOR PARSING PB FORMAT CIRCULATION DATA

(71) Applicant: Feitian Technologies Co., Ltd., Beijing (CN)

(72) Inventors: Ke Xu, Beijing (CN); Zhou Lu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 48 days.

(21) Appl. No.: 18/878,906

(22) PCT Filed: Oct. 27, 2023

(86) PCT No.: PCT/CN2023/127271
§ 371 (c)(1),
(2) Date: Dec. 26, 2024

(87) PCT Pub. No.: WO2024/109441
PCT Pub. Date: May 30, 2024

(65) Prior Publication Data
US 2025/0385806 A1 Dec. 18, 2025

(30) Foreign Application Priority Data
Nov. 21, 2022 (CN) ........................ 202211451786.X

(51) Int. Cl.
*H04L 9/00* (2022.01)
*H04L 9/08* (2006.01)

(52) U.S. Cl.
CPC .............. *H04L 9/50* (2022.05); *H04L 9/0825* (2013.01)

(58) Field of Classification Search
CPC .......... H04L 9/50; H04L 9/0825; H04L 69/22
(Continued)

(56) References Cited

U.S. PATENT DOCUMENTS 8,032,759 B2 * 10/2011 Goldman .............. H04L 9/3247 713/180
10,992,469 B2 * 4/2021 Cheng .................. H04L 9/0897
(Continued)

OTHER PUBLICATIONS

Eder J. Scheid, "Edge2BC: a Practical Approach for Edge-to-Blockchain IoT Transactions", IEEE 2021.*

*Primary Examiner* — Samson B Lemma
(74) *Attorney, Agent, or Firm* — J. Clinton Wimbish; Maynard Nexsen PC

(57) ABSTRACT

A method for parsing circulation data in a PB format, which includes: setting, by a terminal, a start identification and an end identification for to-be-signed data extracted from a cache; calling a preset function to split the to-be-signed data to obtain a splitting result, and updating the start identification and the end identification respectively according to a length of parameter data in the splitting result to obtain an updated start identification and an updated end identification; generating, by the terminal, a signing request, and sending the signing request to a hardware device to which the terminal is connected, parsing, by the hardware device, the signing request when a signature result obtaining request is received, determining to-be-displayed data according to parameter data in a parsing result, and displaying the to-be-displayed data; and generating, by the hardware device, a private key according to a private key derived address parsed from the signing request, and signing the to-be-signed data parsed from the signing request with the private key. According to the present invention, the hardware device can rapidly parse the circulation data in the PB format, thereby achieving the effect that "what you see is what you sign".

14 Claims, 3 Drawing Sheets

(58) Field of Classification Search
USPC .......................................................... 713/189
See application file for complete search history.

(56) References Cited

U.S. PATENT DOCUMENTS

| | | | | |
|---|---|---|---|---|
| 11,632,244 | B2 * | 4/2023 | Yadlin | H04L 9/0861 713/171 |
| 2011/0099388 | A1 * | 4/2011 | Hett | H04L 63/12 713/193 |
| 2012/0072723 | A1 * | 3/2012 | Orsini | G06F 21/6218 713/165 |
| 2012/0166576 | A1 * | 6/2012 | Orsini | H04L 67/1097 709/217 |
| 2017/0237569 | A1 * | 8/2017 | Vandervort | H04L 63/061 713/171 |
| 2020/0092323 | A1 * | 3/2020 | Wang | G06Q 20/38215 |
| 2021/0129723 | A1 | 5/2021 | Line et al. | |
| 2023/0246847 | A1 * | 8/2023 | Hieronimi | H04L 9/3247 713/176 |
| 2023/0353385 | A1 * | 11/2023 | Chou | H04L 9/3239 |
| 2024/0015026 | A1 * | 1/2024 | Armleder | H04L 9/3249 |

* cited by examiner

METHOD AND SYSTEM FOR PARSING PB FORMAT CIRCULATION DATA

This application is a US application, which claims priority to PCT Application No. PCT/CN2023/1127271, filed Oct. 27, 2023, which claims priority to CN application No. 202211451786.X, filed Nov. 21, 2022, which are each incorporated herein by reference in their entireties.

FIELD OF THE INVENTION

The present invention relates to a method for parsing circulation data in a protocol buffer (PB) format and a system therefor, and belongs to the technical field of blockchains.

PRIOR ART

Protocol Buffers is an efficient structured data storage method, abbreviated as Protobuf or PB.

A method for using Protocol Buffers is as follows:

1. proto files are formulated, and message formats are customized;
2. a protoc tool is used to generate custom message classes in a desired language by a PB compiler.

Information is serialized and deserialized by using the custom message classes generated by the PB compiler.

In data circulation media, a data circulation encoding format used by some media is a PB format, and therefore, it is necessary to parse the PB in order to achieve the effect that "what you see is what you sign" on a hardware device.

However, when the current hardware devices cannot parse circulation data in a PB format, how to provide a parsing method so that the circulation data in the PB format can achieve the effect that "what you see is what you sign" on hardware devices has become an urgent technical problem to be solved.

SUMMARY OF THE INVENTION

One object of the present invention is to provide a method for parsing circulation data in a protocol buffer (PB) format, in which a hardware device can rapidly parse the circulation data in the PB format, thereby achieving the effect that "what you see is what you sign".

Another object of the present invention is to provide a system for parsing circulation data in a protocol buffer (PB) format, in which a hardware device can rapidly parse the circulation data in the PB format, thereby achieving the effect that "what you see is what you sign".

According to a first aspect of the present invention, there is provided a method for parsing circulation data in a protocol buffer (PB) format, including:

Step S1: receiving, by a terminal, an operation instruction triggered by a user, and extracting to-be-signed data from a cache, and setting a first start identification and a first end identification for the to-be-signed data according to a data length of the to-be-signed data;

Step S2: calling, by the terminal, a preset first function to perform first splitting on the to-be-signed data to obtain a first splitting result, in which the first splitting result includes five items of data of a block byte, a block hash, a time-out period, contract data, and a timestamp;

Step S3: computing, by the terminal, a total length of three items of data of the block byte, the block hash, and the time-out period in the first splitting result, and updating the first start identification based on the total length of the three items of data to obtain a second start identification;

Step S4: computing, by the terminal, a total length of the timestamp data in the first splitting result, and updating the first end identification based on the total length of the timestamp data to obtain a second end identification;

Step S5: calling, by the terminal, a preset second function to perform second splitting on the contract data in the first splitting result to obtain a second splitting result, in which the second splitting result includes two items of data of a contract type and a contract parameter;

Step S6: computing, by the terminal, a total length of the contract type data in the second splitting result, and updating the second start identification based on a tag field of the contract data, a contract length field of the contract data, and the total length of the contract type data to obtain a third start identification;

Step S7: calling, by the terminal, a preset third function to perform third splitting on the contract parameter in the second splitting result to obtain a third splitting result, in which the third splitting result includes two items of data of a parameter type and parameter data;

Step S8: determining, by the terminal, an actual called function according to the parameter type in the third splitting result, and determining whether the actual called function corresponds to the operation instruction, and if yes, executing a step S9, otherwise, reporting an error, and ending the method;

Step S9: computing, by the terminal, a total length of the parameter type data in the third splitting result, and updating the third start identification based on a tag field of the contract parameter, a parameter length field of the contract parameter and the total length of the parameter type data to obtain a fourth start identification;

Step S10: obtaining, by the terminal, a fourth function corresponding to the actual called function, and splitting the parameter data in the third splitting result with the fourth function to obtain a fourth splitting result, in which the fourth splitting result includes at least three items of data;

Step S11: computing, by the terminal, a data length of first target data in the fourth splitting result, and updating the fourth start identification based on the data length of the first target data to obtain a fifth start identification;

Step S12: computing, by the terminal, an actual data length of second target data in the fourth splitting result, and updating the second end identification based on the actual data length of the second target data to obtain a third end identification;

Step S13: obtaining, by the terminal, a preset target signature instruction header, and computing an actual data length of to-be-displayed data in the fourth splitting result, generating a signing request according to the to-be-signed data, a target signature instruction header, the fifth start identification, the third end identification, and the actual data length of the to-be-displayed data, and sending the signing request to a hardware device to which the terminal is connected;

Step S14: saving, by the hardware device, the signing request, and waiting to receive a signature result obtaining request sent by the terminal;

Step S15: parsing, by the hardware device, the signing request when the signature result obtaining request is received, determining the to-be-displayed data from the to-be-signed data in a parsing result according to the fifth start identification, the third end identification, and the actual data length of the to-be-displayed data in the parsing result;

Step S16: displaying, by the hardware device, the to-be-displayed data; and

Step S17: generating, by the hardware device, a private key according to a private key derived address parsed from the signing request, signing the to-be-signed data parsed from the signing request with the private key, and returning a signature result to the terminal.

According to a second aspect of the present invention, there is provided a system for parsing circulation data in a protocol buffer (PB) format, including:

an identification setting module, configured to receive an operation instruction triggered by a user, and extract to-be-signed data from a cache, and set a first start identification and a first end identification for the to-be-signed data according to a data length of the to-be-signed data;

a data splitting module, configured to call a preset first function to perform first splitting on the to-be-signed data to obtain a first splitting result, in which the first splitting result includes five items of data of a block byte, a block hash, a time-out period, contract data, and a timestamp;

an identification updating module, configured to compute a total length of three items of data of the block byte, the block hash, and the time-out period in the first splitting result, and update the first start identification based on the total length of the three items of data to obtain a second start identification; in which the identification updating module is further configured to compute a total length of the timestamp data in the first splitting result, and update the first end identification based on the total length of the timestamp data to obtain a second end identification;

the data splitting module is further configured to call a preset second function to perform second splitting on the contract data in the first splitting result to obtain a second splitting result, in which the second splitting result includes two items of data of a contract type and a contract parameter;

the identification updating module is further configured to compute a total length of the contract type data in the second splitting result, and update the second start identification based on a tag field of the contract data, a contract length field of the contract data, and the total length of the contract type data to obtain a third start identification; and the data splitting module is further configured to call a preset third function to perform third splitting on the contract parameter in the second splitting result to obtain a third splitting result, in which the third splitting result includes two items of data of a parameter type and parameter data;

a function determining module, configured to determine an actual called function according to the parameter type in the third splitting result, and determine whether the actual called function corresponds to the operation instruction, if yes, trigger the identification updating module, otherwise, report an error, and perform ending; in which the identification updating module is further configured to compute a total length of the parameter type data in the third splitting result, and update the third start identification based on a tag field of the contract parameter, a parameter length field of the contract parameter and the total length of the parameter type data to obtain a fourth start identification;

the data splitting module is further configured to obtain a fourth function corresponding to the actual called function, and split the parameter data in the third splitting result with the fourth function to obtain a fourth splitting result, in which the fourth splitting result includes at least three items of data;

the identification updating module is further configured to compute a data length of first target data in the fourth splitting result, and update the fourth start identification based on the data length of the first target data to obtain a fifth start identification; and the identification updating module is further configured to compute an actual data length of second target data in the fourth splitting result, and update the second end identification based on the actual data length of the second target data to obtain a third end identification;

a request generation module, configured to obtain a preset target signature instruction header, and compute an actual data length of to-be-displayed data in the fourth splitting result, generate a signing request according to the to-be-signed data, a target signature instruction header, the fifth start identification, the third end identification, and the actual data length of the to-be-displayed data, and send the signing request to a request receiving module;

the request receiving module, configured to save the signing request, and wait to receive a signature result obtaining request;

a data determination module, configured to parse the signing request when the signature result obtaining request is received, and determine the to-be-displayed data from the to-be-signed data in a parsing result according to the fifth start identification, the third end identification, and the actual data length of the to-be-displayed data in the parsing result;

a data display module, configured to display the to-be-displayed data; and a signature processing module, configured to generate a private key according to a private key derived address parsed from the signing request, sign the to-be-signed data parsed from the signing request with the private key, and return a signature result.

According to a third aspect of the present invention, there is provided a computer-readable storage medium having a computer program stored thereon which, when executed by a processor, implements the steps of any one of the above methods.

According to a fourth aspect of the present invention, there is provided a terminal, including a memory, a processor and a computer program stored on the memory and executable on the processor, in which the processor, when executing the program, implements the steps of any one of the above methods.

The beneficial effects brought by the present invention at least include:

the to-be-signed data (the PB format) is processed with the high processing performance of the terminal, and a processing result is sent together with the to-be-signed data to the hardware device, and the hardware device finds to-be-displayed data from the to-be-signed data according to processing data sent by the terminal and displays the to-be-displayed data on a screen. With the above method, the hardware device can quickly parse the circulation data in the PB format, thereby achieving the effect that "what you see is what you sign".

BRIEF DESCRIPTION OF THE DRAWINGS

To illustrate the technical solutions of the present invention more clearly, the drawings required for use in the description of the embodiments will be briefly described below. Obviously, the drawings in the following description are only some embodiments of the present invention, and other drawings can be obtained from these drawings for those skilled in the art without inventive step.

DETAILED DESCRIPTION OF PREFERRED EMBODIMENTS

In order to make the objects, technical solutions and advantages of the present invention clear, the present invention will be further described in detail with reference to the accompanying drawings.

When the following description refers to the drawings, unless otherwise indicated, the same numbers in different drawings represent the same or similar elements. The embodiments described in the following exemplary embodiments do not represent all embodiments consistent with the present invention. Rather, they are merely examples of systems and methods consistent with some aspects of the present invention as detailed in the appended claims.

In the description of the present invention, it should be understood that the terms "first", "second", etc. are used for descriptive purposes only, and are not to be construed as indicating or implying relative importance. The specific meaning of the above terms in the present invention will be understood by those skilled in the art. In addition, in the description of the present invention, unless otherwise specified, "a plurality of" means two or more. "And/or", describing an association relationship of associated objects, indicates that three relationships may exist, for example, A and/or B may indicate that A exists alone, both A and B exist, and B exists alone. The character "/" generally indicates that the associated objects before and after are in an "OR" relationship.

Figure 1:
FIG. 1 is a schematic flow diagram of a method for parsing circulation data in a protocol buffer (PB) format according to an embodiment of the present invention.
Figure 2:
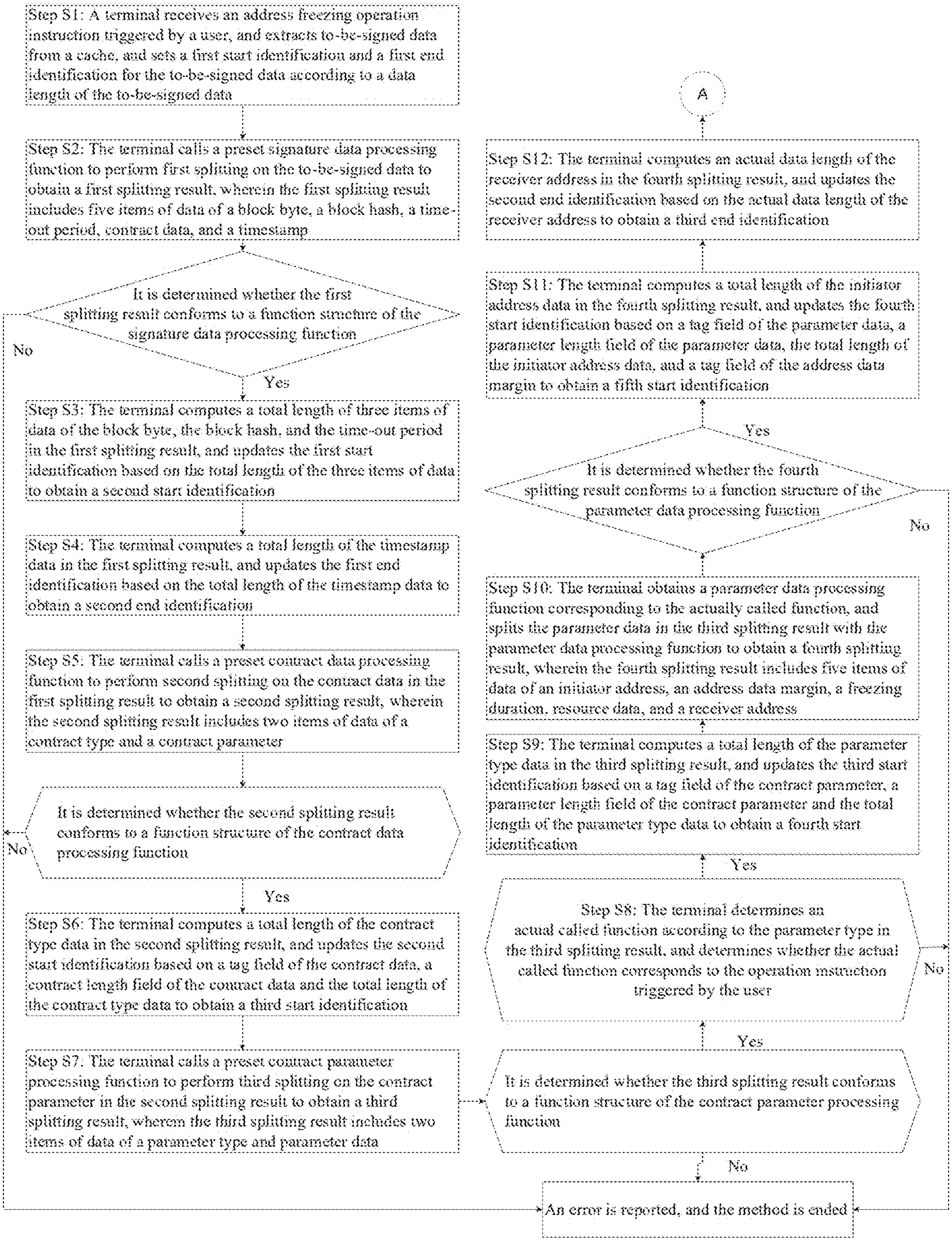
FIGS. 2 to 3 are schematic flow diagrams of another method for parsing circulation data in a protocol buffer (PB) format according to another embodiment of the present invention.
Figure 3:
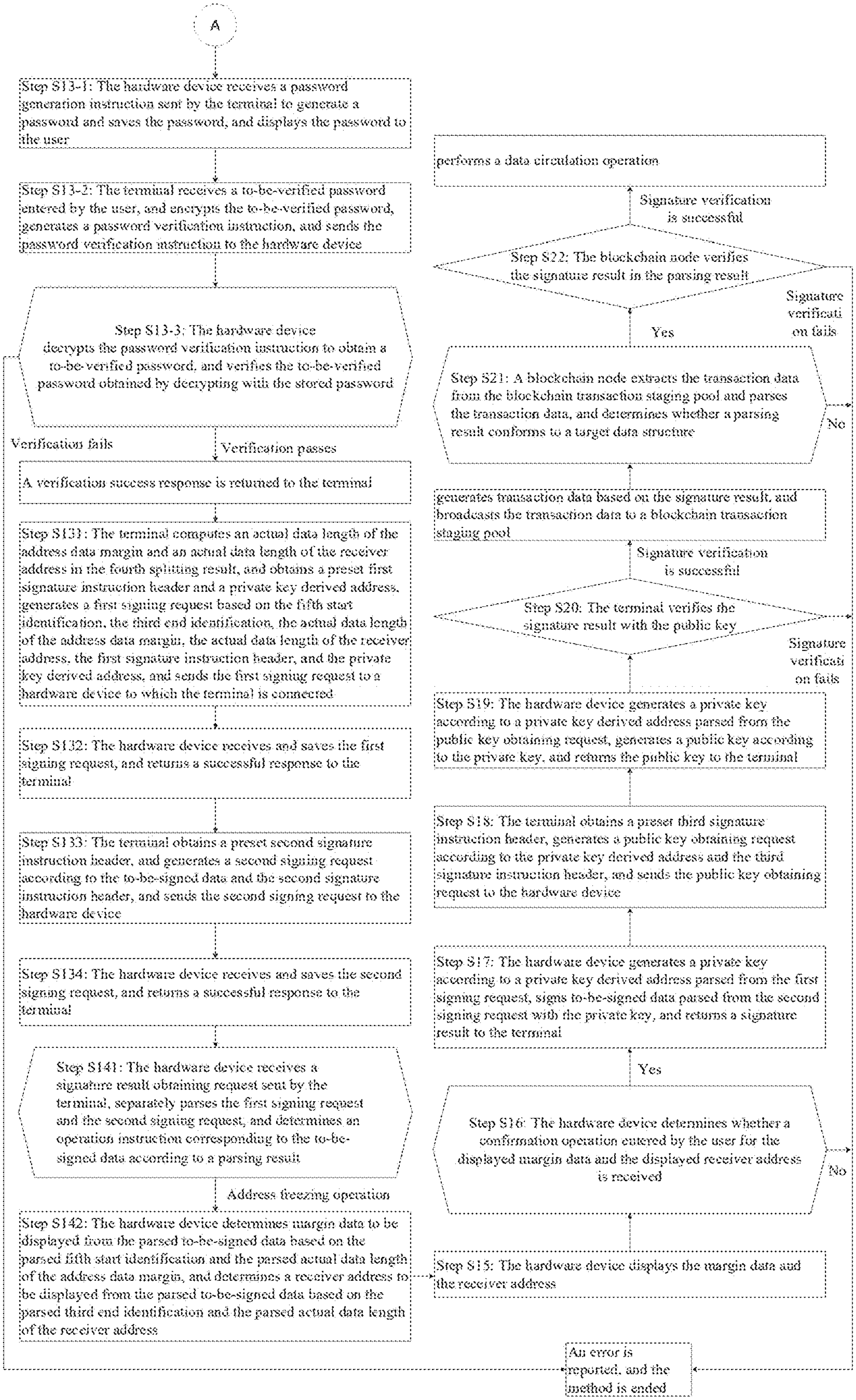

With reference to FIGS. 1 to 3, a method for realizing the effect that what you see is what you sign for circulation data in a protocol buffer (PB) format according to an embodiment of the present invention will be described below in detail.

Please refer to FIG. 1, which is a schematic flow diagram of a method for parsing circulation data in a protocol buffer (PB) format according to an embodiment of the present invention.

As shown in FIG. 1, the method in the embodiment of the present invention may include the following steps:

Step SA-1: a terminal receives an operation instruction triggered by a user, and extracts to-be-signed data from a cache, and sets a first start identification and a first end identification for the to-be-signed data according to a data length of the to-be-signed data;

Step SA-2: the terminal calls a preset first function to perform first splitting on the to-be-signed data to obtain a first splitting result, in which the first splitting result includes five items of data of a block byte, a block hash, a time-out period, contract data, and a timestamp;

Step SA-3: the terminal computes a total length of three items of data of the block byte, the block hash and the time-out period in the first splitting result, and updates the first start identification based on the total length of the three items of data to obtain a second start identification;

Step SA-4: the terminal computes a total length of the timestamp data in the first splitting result, and updates the first end identification based on the total length of the timestamp data to obtain a second end identification;

Step SA-5: the terminal calls a preset second function to perform second splitting on the contract data in the first splitting result to obtain a second splitting result, in which the second splitting result includes two items of data of a contract type and a contract parameter;

Step SA-6: the terminal computes a total length of the contract type data in the second splitting result, and updates the second start identification based on a tag field of the contract data, a contract length field of the contract data and the total length of the contract type data to obtain a third start identification;

Step SA-7: the terminal calls a preset third function to perform third splitting on the contract parameter in the second splitting result to obtain a third splitting result, in which the third splitting result includes two items of data of a parameter type and parameter data;

Step SA-8: the terminal determines an actual called function according to the parameter type in the third splitting result, and determines whether the actual called function corresponds to the operation instruction triggered by the user, and if yes, a step SA-9 is executed, otherwise, an error is reported, and the method is ended;

Step SA-9: the terminal computes a total length of the parameter type data in the third splitting result, and updates the third start identification based on a tag field of the contract parameter, a parameter length field of the contract parameter and the total length of the parameter type data to obtain a fourth start identification;

Step SA-10: the terminal obtains a fourth function corresponding to the actual called function, and splits the parameter data in the third splitting result with the fourth function to obtain a fourth splitting result, in which the fourth splitting result includes at least three items of data;

Step SA-11: the terminal computes a data length of first target data in the fourth splitting result, and updates the fourth start identification based on the data length of the first target data to obtain a fifth start identification;

Step SA-12: the terminal computes an actual data length of second target data in the fourth splitting result, and updates the second end identification based on the actual data length of the second target data to obtain a third end identification;

Step SA-13: the terminal obtains a preset target signature instruction header, and computes an actual data length of to-be-displayed data in the fourth splitting result, generates a signing request according to the to-be-signed data, a target signature instruction header, the fifth start identification, the third end identification, and the actual data length of the to-be-displayed data, and sends the signing request to a hardware device to which the terminal is connected;

Step SA-14: the hardware device saves the signing request, and waits to receive a signature result obtaining request sent by the terminal;

Step SA-15: the hardware device parses the signing request when the signature result obtaining request is received, determines the to-be-displayed data from the to-be-signed data in a parsing result according to the fifth start identification, the third end identification, and the actual data length of the to-be-displayed data in the parsing result;

Step SA-16: the hardware device displays the to-be-displayed data; and

Step SA-17: the hardware device generates a private key according to a private key derived address parsed from the signing request, signs the to-be-signed data parsed from the signing request with the private key, and returns a signature result to the terminal.

In the present invention, the to-be-signed data (the PB format) is processed with the high processing performance of the terminal, and a processing result is sent together with the to-be-signed data to the hardware device, and the hardware device finds to-be-displayed data from the to-be-signed data according to processing data sent by the terminal and displays the to-be-displayed data on a screen. With the above method, the hardware device can quickly parse the circulation data in the PB format, thereby achieving the effect that "what you see is what you sign".

Please refer to FIGS. 2 to 3, which are schematic flow diagrams of a method for parsing circulation data in a protocol buffer (PB) format according to an embodiment of the present invention, and the schematic diagrams illustrate a process flow of to-be-signed data under an address freezing operation.

As shown in FIGS. 2 to 3, the method in the embodiment of the present invention may include the following steps:

Step S1: a terminal receives an address freezing operation instruction triggered by a user, and extracts to-be-signed data from a cache, and sets a first start identification and a first end identification for the to-be-signed data according to a data length of the to-be-signed data.

The to-be-signed data is, for example, as follows:

0a0223bc22082b72b05b7674b2574090f288f7d42e5a6f0
80b126b0a32747970652e676f6f676c
65617069732e636f6d2f70726f746f636f6c2e467265657a65
42616c616e6365436f6e7472616374123
50a15412951299aca154f795560460308861fce0f94875a108
827180350017a1541dcb7323a9385914
c66daa0d0c94b3d58764c889170a5b885f7d42e.

The data length of the to-be-signed data is 141 bytes.

The first start identification set for the to-be-signed data according to the data length of the to-be-signed data is 0, and the first end identification set for the to-be-signed data according to the data length of the to-be-signed data is 141.

In detail, before the step S1, the method further includes:

a terminal saves to-be-signed data in a cache; and a connection is established between the terminal and a hardware device and password authentication is completed.

Where, a manner of establishing the connection between the terminal and the hardware device includes, but is not limited to, Bluetooth connection.

Step S2: the terminal calls a preset signature data processing function to perform first splitting on the to-be-signed data to obtain a first splitting result, in which the first splitting result includes five items of data of a block byte, a block hash, a time-out period, contract data, and a timestamp.

Where, the preset signature data processing function is a raw function, and tag definitions of all data contained in the function are, for example, as follows:

```
message raw {
bytes ref_block_bytes = 1;
int64 ref_block_num = 3;
bytes ref_block_hash = 4;
int64 expiration = 8;
repeated authority auths = 9;
bytes data = 10;
repeated Contract = 11;
bytes scripts = 12;
int64 timestamp = 14;
int64 fee_limit = 18;}
```

When the raw function is used for splitting, at most only the data types listed above can be split out.

Where, the numbers behind equal signs represent tags corresponding to the meaning represented by the data, and if tags other than the numbers are split, it indicates that current data has an error, and cannot be processed continuously, the error is reported, and ending is performed.

After the example of the to-be-signed data in the step S1 is split by the above signature data processing function, the first splitting result obtained is as follows:

0a0223bc
22082b72b05b7674b257
4090f288f7d42e
5a6f080b126b0a32747970652e676f6f676c65617069732
e636f6d2f70726f746f636f6c2e46726
5657a6542616c616e6365436f6e747261637412350a1
5412951299aca154f795560460308861fce0f9
4875a108827180350017a1541dcb7323a9385914c66d
aa0d0c94b3d58764c8891
70a5b885f7d42e Where, 0a0223bc is the block byte, 22082b72b05b7674b257 is the block hash, 4090f288f7d42e is the time-out period, 5a6f080b126b0a32747970652e676f6f676c656170697 32e636f6d2f70726f746f636f6c2e467265657 a6542616c616e6365436f6e747261637412350a15412 951299aca154f795560460308861fce0f94875 a108827180350017a1541dcb7323a9385914c66daa0d 0c94b3d58764c8891 is the contract data, and70a5b885f7d42e is the timestamp.

The splitting using the raw function is illustrated by taking the timestamp data as an example:

in the timestamp data, 70 is a tag and is hexadecimal, when the tag is converted to a binary system, the tag is 01110000, the 8-bit binary number is divided into the first 5 bits and the last 3 bits, the first 5 bits are 01110, the last 3 bits are 000, when the tag is converted to a decimal system, the first 5 bits are 14, the last 3 bits are 0, and 0 in the last 3 bits represents a data type of the timestamp.

From the tag definitions of the raw function, it can be found that the number 14 corresponds to int64 timestamp; timestamp is a timestamp; according to the official definition of PB, types represented by 0 include int32, int64, uint32, uint64, sint32, sint64, bool and enum, and these types of data are compatible with each other in PB, so it can be seen that the tag 70 represents timestamp data of the type int64 in the current splitting step.

In addition, an attacker may additionally insert new data into the to-be-signed data to change the original data and then achieve the purpose of data transfer, causing losses to the user.

In order to prevent the to-be-signed data from being tampered with, further, the terminal, after obtaining the first splitting result, further includes processing actions as follows:

whether the first splitting result conforms to a function structure of the signature data processing function is determined, and if yes, a step S3 is executed, otherwise, an error is reported, and ending is performed.

When the attacker additionally inserts new data into the to-be-signed data, a situation that a data structure does not meet the requirements of the function will appear. Thus, after calling the signature data processing function to split the to-be-signed data, data structure determination is added to determine whether the split data structure conforms to the function structure of the signature data processing function, and if the split data structure conforms to the function structure of the signature data processing function, the to-be-signed data is not currently attacked and tampered with, a step S3 is executed, and if the split data structure does not conform to the function structure of the signature data processing function, the to-be-signed data has been attacked and tampered with, an error is reported, and ending is performed.

Specifically, the signature data processing function is composed of five parts of the block byte, the block hash, the time-out period, the contract data, and the timestamp, and when the first splitting result contains the contents of the five parts as well, the first splitting result is considered to conform to the function structure of the signature data processing function.

Step S3: the terminal computes a total length of three items of data of the block byte, the block hash, and the time-out period in the first splitting result, and updates the first start identification based on the total length of the three items of data to obtain a second start identification.

Based on the example in the step S2, in the first splitting result, the total length of the block byte data is 4 bytes, the total length of the block hash data is 10 bytes, the total length of the time-out period data is 7 bytes, and the total length of the three items of data obtained by a summing operation is 21 bytes.

Based on the total length of the three items of data, the first start identification 0 is moved backward by 21 bytes to obtain the second start identification 21, i.e., a start identification is moved from a position before the block byte 0a0223bc to a position behind the time-out period 4090f288f7d42e.

Step S4: the terminal computes a total length of the timestamp data in the first splitting result, and updates the first end identification based on the total length of the timestamp data to obtain a second end identification.

Based on the example in the step S2, the total length of the timestamp data in the first splitting result is 7 bytes.

The second end identification 134 is obtained by moving the first end identification 141 forward by 7 bytes according to the total length of the timestamp data, i.e., an end identification is moved from a position behind the timestamp 70a5b885f7d42e to a position behind the contract data:

5a6f080b126b0a32747970652e676f6f676c65617069732
e636f6d2f70726f746f636f6c2e46726
5657a6542616c616e6365436f6e747261637412350a1

5412951299aca154f795560460308861fce0f9
4875a108827180350017a1541dcb7323a9385914c66d
aa0d0c94b3d58764c8891.

Step S5: the terminal calls a preset contract data processing function to perform second splitting on the contract data in the first splitting result to obtain a second splitting result, in which the second splitting result includes two items of data of a contract type and a contract parameter.

Where, tag definitions of all data contained in the contract data processing function are, for example, as follows:

```
message Contract {
ContractType type = 1;
google.protobuf.Any parameter = 2;
bytes provider = 3;
bytes ContractName = 4;
int32 Permission_id = 5;}
```

After the example of the above contract data is split by the above contract data processing function, the second splitting result obtained is as follows:

080b

126b0a32747970652e676f6f676c65617069732e636f6d2
f70726f746f636f6c2e467265657a654
2616c616e6365436f6e747261637412350a154129512
99aca154f795560460308861fce0f94875a108
827180350017a1541dcb7323a9385914c66daa0d0c94
b3d58764c8891, in which 080b is the contract type, and 126b0a32747970652e676f6f676c65617069732e636f6d2
f70726f746f636f6c2e467265657a654
2616c616e6365436f6e747261637412350a154129512
99aca154f795560460308861fce0f94875a108
827180350017a1541dcb7323a9385914c66daa0d0c94
b3d58764c8891 is the contract parameter.

The attacker may attack and tamper with the to-be-signed data at any time. To prevent the to-be-signed data from being tampered with, each time a function is called to split the data, it is necessary to determine the split data structure.

Specifically, the terminal, after obtaining the second splitting result, further includes processing actions as follows:

whether the second splitting result conforms to a function structure of the contract data processing function is determined, and if yes, a step S6 is executed, otherwise, an error is reported, and the method is ended.

Step S6: the terminal computes a total length of the contract type data in the second splitting result, and updates the second start identification based on a tag field of the contract data, a contract length field of the contract data and the total length of the contract type data to obtain a third start identification.

The total length of the contract type data in the second splitting result is 2 bytes, the tag field of the contract data is 1 byte, and the contract length field of the contract data is 1 byte.

Based on the tag field of the contract data (080b in the above data example), the contract length field of the contract data (126b in the above data example) and the total length of the contract type data, the third start identification 25 is obtained by moving backward the second start identification 21 by 4 bytes, i.e., a start identification is moved from a position behind the time-out period 4090f288f7d42e to a position behind the contract type 080b.

Step S7: the terminal calls a preset contract parameter processing function to perform third splitting on the contract parameter in the second splitting result to obtain a third splitting result, in which the third splitting result includes two items of data of a parameter type and parameter data.

Where, tag definitions of all data contained in the contract parameter processing function are, for example, as follows:

```
message Any {
String type_url = 1;
Bytes value = 2;}
```

After the example of the above contract parameter is split by the above contract parameter processing function, the third splitting result obtained is as follows:

0a32747970652e676f6f676c65617069732e636f6d2f707
26f746f636f6c2e467265657a6542616
c616e6365436f6e7472616374,

12350a15412951299aca154f795560460308861fce0f948
75a10882718035001 7a1541dcb7323a
9385914c66daa0d0c94b3d58764c8891, in which, 0a32747970652e676f6f676c65617069732e636f6d2f7072
6f746f636f6c2e467265657a6542616
c616e6365436f6e7472616374 is the parameter type, and 12350a15412951299aca154f795560460308861fce0f948
75a10882718035001 7a1541dcb7323a
9385914c66daa0d0c94b3d58764c8891 is the parameter data.

The terminal, after obtaining the third splitting result, further includes processing actions as follows:

whether the third splitting result conforms to a function structure of the contract parameter processing function is determined, and if yes, a step S8 is executed, otherwise, an error is reported, and the method is ended.

Step S8: the terminal determines an actual called function according to the parameter type in the third splitting result, and determines whether the actual called function corresponds to the operation instruction triggered by the user, and if yes, a step S9 is executed, otherwise, an error is reported, and the method is ended.

The parameter type consists of three parts: 1 byte of a tag, 1 byte of a data length value, and actual data.

From the actual data of the parameter type, the function actually called by the parameter data can be known.

The specific operation can be known from 0a32 in the above example, and the actual called function corresponding to the operation can be determined from a correspondence stored inside the terminal.

The operation instruction triggered by the user in this embodiment is an address freezing operation instruction.

Step S9: the terminal computes a total length of the parameter type data in the third splitting result, and updates the third start identification based on a tag field of the contract parameter, a parameter length field of the contract parameter and the total length of the parameter type data to obtain a fourth start identification.

The total length of the parameter type data in the third splitting result is 52 bytes, the tag field of the contract parameter is 1 byte, and the parameter length field of the contract parameter is 1 byte.

According to the tag field of the contract parameter (0a in the above data example), the parameter length field of the contract parameter (32 in the above data example) and the total length of the parameter type data, the third start identification 25 is moved backward by 54 bytes to obtain the fourth start identification 79, i.e., a start identification is moved from a position behind the contract type 080b to a position behind the parameter type 0a32747970652e676f6f676c65617069732e636f6d2f707
26f746f636f6c2e467265657a6542616
c616e6365436f6e7472616374.

Step S10: the terminal obtains a parameter data processing function corresponding to the actually called function, and splits the parameter data in the third splitting result with the parameter data processing function to obtain a fourth splitting result, in which the fourth splitting result includes five items of data of an initiator address, an address data margin, a freezing duration, resource data, and a receiver address.

Different actual called functions correspond to different parameter data processing functions.

Tag definitions of all data contained in the parameter data processing function corresponding to the actual called function in this embodiment are, for example, as follows:

```
message FreezeBalanceContract {
bytes owner_address = 1;
int64 frozen_balance = 2;
int64 frozen_duration = 3;
ResourceCode resource = 10;
bytes receiver_address = 15;}
```

After the example of the above parameter data is split by the above parameter data processing function, the fourth splitting result obtained is as follows:

0a15412951299aca154f795560460308861fce0f94875a
1803
5001
7a1541dcb7323a9385914c66daa0d0c94b3d58764c8891

Where 0a15412951299aca154f795560460308861fce0f94875a is the initiator address, 108827 is the address data margin (in which 10 is a tag field of the address data margin and 8827 is actual data of the address data margin), 1803 is the freezing duration, 5001 is the resource data, and 7a1541dcb7323a9385914c66daa0d0c94b3d58764c8891 is the receiver address (in which 7a is a tag field of the receiver address, 15 is a length field of the receiver address, and 41dcb7323a9385914c66daa0d0c94b3d58764c8891 is actual data of the receiver address).

The terminal, after obtaining the fourth splitting result, further includes processing actions as follows:

whether the fourth splitting result conforms to a function structure of the parameter data processing function is determined, and if yes, a step S11 is executed, otherwise, an error is reported, and the method is ended.

Step S11: the terminal computes a total length of the initiator address data in the fourth splitting result, and updates the fourth start identification based on a tag field of the parameter data, a parameter length field of the parameter data, the total length of the initiator address data, and the tag field of the address data margin to obtain a fifth start identification.

Where the tag field of the parameter data is 1 byte, the parameter length field of the parameter data is 1 byte, the total length of the initiator address data in the fourth splitting result is 23 bytes, and the tag field of the address data margin is 1 byte.

According to the tag field for the parameter data (12 in the above data example), the parameter length field of the parameter data (35 in the above data example), the total length of the initiator address data, and the tag field of the address data margin (10 in the above example 108827), the fourth start identification 79 is moved backward by 26 bytes to obtain the fifth start identification 105, i.e., a start identification is moved from a position behind the parameter type 0a32747970652e676f6f676c65617069732e636f6d2f707 26f746f636f6c2e467265657a6542616 c616e6365436f6e7472616374 to a position behind the tag field 10 of the address data margin.

Step S12: the terminal computes an actual data length of the receiver address in the fourth splitting result, and updates the second end identification based on the actual data length of the receiver address to obtain a third end identification.

The total length of the receiver address data in the fourth splitting result is 23 bytes, and the tag field and the length field of the receiver address are each 1 byte. Therefore, the actual data length of the receiver address is 21 bytes.

According to the actual data length of the receiver address, the third end identification 113 is obtained by moving the second end identification 134 forward by 21 bytes, i.e., an end identification is moved from a position behind the contract data 5a6f080b126b0a32747970652e676f6f676c65617069732 e636f6d2f70726f746f636f6c2e46726 5657a6542616c616e6365436f6e747261637412350a1 5412951299aca154f795560460308861fce0f9 4875a108827180350017a1541dcb7323a9385914c66d aa0d0c94b3d58764c8891 to a position before the actual data of the receiver address 41dcb7323a9385914c66daa0d0c94b3d58764c8891.

Further, after the step S12, the method further includes:

Step S13-1: the hardware device receives a password generation instruction sent by the terminal to generate a password and saves the password, and displays the password to the user.

In a specific embodiment, the hardware device receives an instruction for displaying a nine-grid numeral interface sent by the terminal, displays the nine-grid numeral interface on a screen for the user, and returns a nine-grid numeral interface display success response to the terminal.

The instruction for displaying the nine-grid numeral interface is, for example: 00290000.

The nine-grid numeral interface generated and displayed by the hardware device is randomly arranged numbers 1-9.

Step S13-2: the terminal receives a to-be-verified password entered by the user, and encrypts the to-be-verified password, generates a password verification instruction, and sends the password verification instruction to the hardware device.

In a specific embodiment, the user enters the to-be-verified password on the terminal according to the randomly arranged numbers 1-9 displayed by the hardware device.

The password verification instruction is, for example: 002002000407070707.

Where 00200200 is an instruction header, 04 represents a password length which is 4 bits, and 07070707 is encrypted to-be-verified password data.

Step S13-3: the hardware device decrypts the password verification instruction to obtain a to-be-verified password, verifies the to-be-verified password obtained by decrypting with the stored password, and if verification passes, a verification success response is returned to the terminal, and a step S13 is executed, otherwise, an error is reported, and the method is ended.

The verification success response returned to the terminal is, for example, 9000.

In a preferred embodiment, the method further includes: the terminal sends a resource object data setting instruction to the hardware device.

Specifically, the terminal generates the resource object data setting instruction based on the instruction header, a resource object icon, a precision, a resource object name, and the like.

The resource object data setting instruction is, for example:

00c700000e0607062050454552000410034006.

Where 00c70000 is an instruction header, and 0e0607062050454552000410034006 is the resource object icon, the precision, the resource object name, etc. to be displayed and signed on the hardware device.

Step S13: the terminal obtains a preset signature instruction header, and computes an actual data length of the address data margin and an actual data length of the receiver address in the fourth splitting result, generates a signing request based on the to-be-signed data, the signature instruction header, the fifth start identification, the third end identification, the actual data length of the address data margin, and the actual data length of the receiver address, and sends the signing request to a hardware device to which the terminal is connected.

The signature instruction header is, for example: 002a010000.

The actual data length of the address data margin is 2 bytes, and the actual data length of the receiver address is 21 bytes in the fourth splitting result.

In the process in which the terminal analyzes the circulation data in the PB format and sends the signing request to the hardware device, the attacker may tamper with the data. In order to prevent the data from being tampered with by the attacker during transmission, in this embodiment, when the signing request is sent to the hardware device to which the terminal is connected, the following processing may be performed:

the terminal encrypts the signing request by using a stored shared key to obtain a signing request ciphertext.

The signing request ciphertext is sent to the hardware device to which the terminal is connected.

In a possible embodiment, before the step S1, the method further includes:

Step S1-1: the terminal and the hardware device generate the same long key respectively through data transfer in Bluetooth pairing;

Step S1-2: the terminal generates a first public-private key pair, encrypts a first public key in the first public-private key pair by using the long key to get a key agreement request, and sends the key agreement request to the hardware device;

Step S1-3: the hardware device receives the key agreement request and decrypts the key agreement request by using the long key to obtain a first public key;

Step S1-4: the hardware device generates a second public-private key pair, multiplies the first public key by a second private key in the second public-private key pair to obtain a shared key, and saves the shared key;

Step S1-5: the hardware device encrypts a second public key in the second public-private key pair by using the long key to obtain a key agreement response, and returns the key agreement response to the terminal; and Step S1-6: the terminal encrypts the key agreement response by using the long key to obtain the second public key, multiplies the second public key by a first private key to obtain a shared key and saves the shared key.

In addition, the address data margin varies in different examples, and the actual data length of the address data margin will change accordingly. Therefore, for the actual data length of the address data margin needs to be computed separately, the method specifically includes:

the terminal computes an actual data length of the parameter data in the third splitting result, where the parameter data consists of three parts 1 byte of a tag, 1 byte of a data length value, and actual data.

Taking the example given above as an example, a total length of the parameter data in the third splitting result is 55 bytes, and it can be concluded that the actual data length of the parameter data is 53 bytes.

The terminal computes a total length of five items of data of the initiator address, the freezing duration, the resource data, the receiver address, and the tag field of the address data margin, where the total data lengths of the five items of data of the initiator address, the freezing duration, the resource data, the receiver address, and the tag field of the address data margin in the fourth splitting result are known values, which are 23 bytes, 2 bytes, 2 bytes, 23 bytes, and 1 byte, respectively.

The total length of the five items of data is 51 bytes.

A difference operation is performed on the actual data length of the parameter data and the total length of the five items of data, and the computed difference value is taken as the actual data length of the address data margin in the fourth splitting result.

The actual data length of the address data margin in the above example data is 2 bytes.

In a preferred embodiment, the step S13 specifically includes:

Step S131: the terminal computes an actual data length of the address data margin and an actual data length of the receiver address in the fourth splitting result, and obtains a preset first signature instruction header and a private key derived address, generates a first signing request based on the fifth start identification, the third end identification, the actual data length of the address data margin, the actual data length of the receiver address, the first signature instruction header, and the private key derived address, and sends the first signing request to a hardware device to which the terminal is connected.

Step S132: the hardware device receives and saves the first signing request, and returns a successful response to the terminal.

Step S133: the terminal obtains a preset second signature instruction header, and generates a second signing request according to the to-be-signed data and the second signature instruction header, and sends the second signing request to the hardware device.

Step S134: the hardware device receives and saves the second signing request, and returns a successful response to the terminal.

Step S14: the hardware device parses the signing request, determines margin data to be displayed from the to-be-signed data in a parsing result according to the fifth start identification and the actual data length of the address data margin in the parsing result, and determines a receiver address to be displayed from the to-be-signed data in the parsing result according to the third end identification and the actual data length of the receiver address in the parsing result.

The margin data to be displayed is: 8827.

The receiver address to be displayed is:

41dcb7323a9385914c66daa0d0c94b3d58764c8891.

When the signing request is ciphertext data, parsing the signing request by the hardware device specifically includes:

the hardware device decrypts the signing request ciphertext by using the saved shared key, and parses a signing request plaintext obtained by decrypting.

In a preferred embodiment, the step S14 specifically includes:

Step S141: the hardware device receives a signature result obtaining request sent by the terminal, separately parses the first signing request and the second signing request, determines an operation instruction corresponding to the to-be-signed data according to a parsing result, and if the operation instruction is an address freezing operation, a step S142 is executed; and Step S142: the hardware device determines margin data to be displayed from the parsed to-be-signed data based on the parsed fifth start identification and the parsed actual data length of the address data margin, and determines a receiver address to be displayed from the parsed to-be-signed data based on the parsed third end identification and the parsed actual data length of the receiver address.

Step S15: the hardware device displays the margin data and the receiver address.

In a possible embodiment, after the step S15, the method further includes:

Step S16: the hardware device determines whether a confirmation operation entered by the user for the displayed margin data and the displayed receiver address is received, and if yes, a step S17 is executed, otherwise, an error is reported, and the method is ended.

The user compares the data displayed by the hardware device with data on the terminal device, and if the data displayed by the hardware device is consistent with the data on the terminal device, it is confirmed that the data has not been tampered with by the attacker, a confirmation operation is entered on the hardware device, and if the data displayed by the hardware device is not consistent with the data on the terminal device, it is confirmed that the data has been tampered with, a cancellation operation is entered on the hardware device, and the hardware device reports an error, and the method is ended.

Further, the hardware device reports an error if the confirmation operation entered by the user for the displayed margin data and the displayed receiver address is not received within a preset time, and the method is ended.

Step S17: the hardware device generates a private key according to a private key derived address parsed from the first signing request, signs to-be-signed data parsed from the second signing request with the private key, and returns a signature result to the terminal.

The signature result is, for example, as follows:

16658b4d004737334df951cf8728e03108d3cc2a6ebcad306fb7a4e2984c02fa4bd1ad1664fe4768c36c585171d21207a1fcd8080a075f8b472585f8eaf6a53501.

When the attacker simply modifies the circulation data itself (such as the address data margin and the receiver address) without changing the data structure, the above data structure determination process can be smoothly passed, but finally, when data is displayed on the hardware device, the data modified by the attacker is displayed, and the situation that what you see is not what you sign can be avoided by allowing the user to check and confirm whether the displayed data is correct by the step S16.

In this embodiment, a possible situation that what you see is not what you sign is avoided by determining the data structure, encrypting the signing request, and user confirmation, ensuring that the user does not suffer and has losses.

Step S18: the terminal obtains a preset third signature instruction header, generates a public key obtaining request according to the private key derived address and the third signature instruction header, and sends the public key obtaining request to the hardware device.

A private key generated by the hardware device based on the private key derived address is disposable and becomes invalid after use. Therefore, the terminal also needs to provide the private key derived address to the hardware device when obtaining the public key from the hardware device.

Step S19: the hardware device generates a private key according to a private key derived address parsed from the public key obtaining request, generates a public key according to the private key, and returns the public key to the terminal.

Private key data derived from a private key derivation path is a 64-bit hexadecimal random number, by a curve SECP256K1 specified in an elliptic curve algorithm, 04 is added before the computed result to obtain uncompressed public key data, which is a 130-bit hexadecimal number starting with 04, and the uncompressed public key data is subjected to Keccak_256 computation to obtain a compressed public key, which is returned to the terminal.

Step S20: the terminal verifies the signature result with the public key, if signature verification is successful, generates transaction data based on the signature result, and broadcasts the transaction data to a blockchain transaction staging pool, otherwise, an error is reported, and the method is ended.

In a possible way of attacking, the attacker will tamper with the structure of the to-be-signed data and change identification data after the third splitting to cause the hardware device to display correct data, but in fact, the tampered data is signed. To prevent such fraudulent signature situations from occurring, the following operations can be performed:

Step S21: a blockchain node extracts the transaction data from the blockchain transaction staging pool and parses the transaction data, determines whether a parsing result conforms to a target data structure, and if yes, then a step S22 is executed, otherwise, an error is reported, and ending is performed.

The target data structure is a preset PB data structure.

When the parsing result does not conform to the preset PB data structure, the blockchain node cannot obtain correct data, a transaction operation is terminated.

Step S22: the blockchain node verifies the signature result in the parsing result, and if signature verification is successful, performs a data circulation operation, otherwise, an error is reported, and the method is ended.

When the parsing result conforms to the PB data structure and signature verification by the blockchain node is successful, the data is determined to be correct and the data circulation operation is performed, otherwise, when the parsing result conforms to the PB data structure but signature verification by the blockchain node fails, the data is determined to be tampered with and the transaction operation is terminated.

In this embodiment, the problem of fraudulent signature can be effectively solved by the dual operations of verifying the data structure and verifying the signature result by the blockchain node.

In addition, when an operation instruction corresponding to the to-be-signed data is an address unfreezing operation: substantially the same operation flow as the above step S1 to step S17 is performed, except that the parameter type and the parameter data split out in the step S7 are data corresponding to the address unfreezing operation; and the fourth splitting result in the step S10 includes three items of data, which are an initiator address, a frozen content and a receiver address, respectively.

To parse the to-be-signed data for the address unfreezing operation, it is necessary to add identifications to the frozen content and the receiver address, the frozen content points to a start position of actual data of the frozen content after the fourth start identification is moved to a tag length of the initiator address, actual data of the initiator address, and a tag length of the frozen content; and the receiver address points to a start position of actual data of the receiver address before the second end identification is moved to an actual data length of the receiver address (a data length of the receiver address is a fixed value).

The hardware device displays the frozen content and the receiver address.

When an operation instruction corresponding to the to-be-signed data is a first data circulation operation: substantially the same operation flow as the above step S1 to step S17 is performed, except that the parameter type and the parameter data split out in the step S7 are data corresponding to the first data circulation operation; and the fourth splitting result in the step S10 includes three items of data, which are an initiator address, a receiver address, and a circulation amount, respectively.

To parse the to-be-signed data for the first data circulation operation, it is necessary to add identifications to the receiver address and the circulation amount, the receiver address points to a start position of actual data of the receiver address after the fourth start identification is moved to a tag length of the initiator address, actual data of the initiator address, and a tag length of the receiver address; and the circulation amount points to a start position of actual data of the circulation amount before the second end identification is moved to an actual data length of the circulation amount.

The hardware device displays the receiver address and the circulation amount.

When an operation instruction corresponding to the to-be-signed data is a second data circulation operation: substantially the same operation flow as the above step S1 to step S17 is performed, except that the parameter type and the parameter data split out in the step S7 are data corresponding to the second data circulation operation; and the fourth splitting result in the step S10 includes four items of data, which are a resource object name, an initiator address, a receiver address, and the number of resource objects to be circulated.

To parse the to-be-signed data for the second data circulation operation, it is necessary to respectively add identifications to the resource object name, the receiver address, and the number of resource objects to be circulated, the resource object name points to a start position of actual data of the resource object name after the fourth start identification is moved to a tag and length data of the resource object name for a total of 2 bytes; the receiver address points to a start position of actual data of the receiver address after the fourth start identification copied by the terminal is moved to a tag length of the resource object name, length data of the resource object name, actual data of the resource object name, a tag length and actual data of the initiator address, and a tag length and length data of the receiver address; and the number of resource objects to be circulated points to a start position of actual data of the number of resource objects to be circulated before the second end identification is moved to the actual data of the number of resource objects to be circulated.

The hardware device displays the resource object name, the receiver address, and the number of resource objects to be circulated.

The second data circulation operation is taken as an example:

the first signing request generated by the terminal is, for example, as follows:

00f801002600b50812116d2f3434272f313935272f30272f302f30020e0202038901010102731503025307.

Where:

00f80100 is the first signature instruction header, 2600b50812116d2f3434272f313935272f30272f302f30 is the private key derived address, 020e represents the tag and length of 14 bytes, and 0202038901010102731503025307 represents identifications of various data to be displayed on the hardware device, with the following specific meanings:

02 represents the second data circulation operation;

02 03 represents that next data is an identification of the number of resource objects to be circulated, with a data length of 3 bytes;

8901 represents the identification of the number of resource objects to be circulated;

01 represents a length of 1 byte;

01 02 represents that next data is an identification of the receiver address, with a data length of 2 bytes;

73 represents the identification of the receiver address;

15 represents a length of 15 bytes;

03 02 represents that next data is an identification of the resource object name, with a data length of 2 bytes;

53 represents the identification of the resource object name;

07 represents a length of 7 bytes.

The second signing request generated by the terminal is, for example, as follows:

00f80300910a0223bc22082b72b05b7674b2574090f288f7d42e5a730802126f0a32747970652e676f6f676c65617069732e636f6d2f70726f746f636f6c2e5472616e736665724173736574436f6e747261637412390a07313030333430361215412951299aca154f7955604603088 61fce0f94875a1a154174779510264 91cfda5920233b818eb3ced770eb4200470a5b885f7d42e.

Where:

00f80300 is the second signature instruction header, 91 is a next data length, and 91 is a hexadecimal number, and the next data length is 145 when being converted to a decimal system, indicating that the next data length is 145 bytes; and 0a0223bc22082b72b05b7674b2574090f288f7d42e5a730802126f0a32747970652e676f6f676c65617069732e636f6d2f70726f746f636f6c2e5472616e736665724173736574436f6e747261637412390a07313030333430361215412951299aca154f795560460308861fce0f94875a1a15417477951026491cfda5920233b818eb3ced770eb4200470a5b885f7d42e is the to-be-signed data.

The signature result obtaining request received by the hardware device is, for example: 002a0000.

The hardware device signs the example of the to-be-signed data with the private key generated by the example of the private key derived address, and the generated signature result is, for example, as follows:

257dabf4895a3c628bd592893d41a69656b9822bea2a83a31f8b358df19ef8ce218cb754e015b08dc64b67fc4837978d246150a8a900a81489c4b7c64e8056a801.

The public key obtaining request generated by the terminal is, for example, as follows:

00e60000130812116d2f3434272f313935272f30272f302f30.

Where, 00e60000 is the third signature instruction header, 13 is a hexadecimal number of the length, and the length is 19 bytes in decimal system, 0812116d2f3434272f313935272f30272f302f30 is the private key derivation path.

The public key generated by the hardware device is, for example, as follows:

037574509b460adfa48ef3f815108517b7f1eef8aafd2b53e7b10fb844d10b16ae.

The transaction data generated by the terminal is, for example, as follows:

294dd98bb901714fead497a4146e254f341ff40f1ae784865ab049c854644343", "txRawHex": "0a91010a0223bc22082b72b05b7674b2574090f288f7d42e5a730802126f0a32747970652e676f6f676c65617069732e636f6d2f70726f746f636f6c2e5472616e736665724173736574436f6e747261637412390a07313030333430361215412951299aca154f795560460308861fce0f94875a1a15417477951026491cfda5920233b818eb3ced770eb4200470a5b885f7d42e1241257dabf4895a3c628bd592893d41a69656b9822bea2a83a31f8b358df19ef8ce218cb754e015b08dc64b67fc4837978d246150a8a900a81489c4b7c64e8056a801.

When an operation instruction corresponding to the to-be-signed data is a smart contract triggering operation: substantially the same operation flow as the above step S1 to step S17 is performed, except that the parameter type and the parameter data split out in the step S7 are data corresponding to the smart contract triggering operation; and the fourth splitting result in the step S10 includes four items of data, which are an initiator address, a smart contract address, a trigger value, and a data field.

To parse the to-be-signed data for the smart contract triggering operation, it is necessary to add identifications to the smart contract address and the data field, the smart contract address points to a start position of actual data of the smart contract address after the fourth start identification is moved to a tag of the initiator address, length data of the initiator address, actual data of the initiator address, and a tag and length data of the smart contract address; and the data field points to a start position of actual data of the data field before the second end identification is moved to an actual data length of the data field (the actual data length of the data field will be indicated behind a tag of the data field).

The hardware device displays the smart contract address and the data field.

In the present invention, the to-be-signed data (the PB format) is processed with the high processing performance of the terminal, and the position and length of data to be displayed on the hardware device are computed and sent to the hardware device together with the to-be-signed data, and the hardware device directly finds to-be-displayed data from the to-be-signed data according to the position and length sent by the terminal and displays the to-be-displayed data on a screen. With the above method, the hardware device can quickly parse the circulation data in the PB format, thereby achieving the effect that what you see is what you sign.

The following is a system embodiment of the present invention that can be used to perform the method embodiment of the present invention. For details not disclosed in the system embodiment of the present invention, please refer to the method embodiment of the present invention.

The present invention provides a system for parsing circulation data in a protocol buffer (PB) format, including:

an identification setting module, configured to receive an operation instruction triggered by a user, and extract to-be-signed data from a cache, and set a first start identification and a first end identification for the to-be-signed data according to a data length of the to-be-signed data;

a data splitting module, configured to call a preset first function to perform first splitting on the to-be-signed data to obtain a first splitting result, in which the first splitting result includes five items of data of a block byte, a block hash, a time-out period, contract data, and a timestamp;

an identification updating module, configured to compute a total length of three items of data of the block byte, the block hash, and the time-out period in the first splitting result, and update the first start identification based on the total length of the three items of data to obtain a second start identification; in which the identification updating module is further configured to compute a total length of the timestamp data in the first splitting result, and update the first end identification based on the total length of the timestamp data to obtain a second end identification;

the data splitting module is further configured to call a preset second function to perform second splitting on the contract data in the first splitting result to obtain a second splitting result, in which the second splitting result includes two items of data of a contract type and a contract parameter;

the identification updating module is further configured to compute a total length of the contract type data in the second splitting result, and update the second start identification based on a tag field of the contract data, a contract length field of the contract data and the total length of the contract type data to obtain a third start identification; and the data splitting module further is configured to call a preset third function to perform third splitting on the contract parameter in the second splitting result to obtain a third splitting result, in which the third splitting result includes two items of data of a parameter type and parameter data;

a function determining module, configured to determine an actual called function according to the parameter type in the third splitting result, and determine whether the actual called function corresponds to the operation instruction, if yes, trigger the identification updating module, otherwise, report an error, and perform ending; in which the identification updating module is further configured to compute a total length of the parameter type data in the third splitting result, and update the third start identification based on a tag field of the contract parameter, a parameter length field of the contract parameter and the total length of the parameter type data to obtain a fourth start identification;

the data splitting module is further configured to obtain a fourth function corresponding to the actual called function, and split the parameter data in the third splitting result with the fourth function to obtain a fourth splitting result, in which the fourth splitting result includes at least three items of data;

the identification updating module is further configured to compute a data length of first target data in the fourth splitting result, and update the fourth start identification based on the data length of the first target data to obtain a fifth start identification; and the identification updating module is further configured to compute an actual data length of second target data in the fourth splitting result, and update the second end identification based on the actual data length of the second target data to obtain a third end identification;

a request generation module, configured to obtain a preset target signature instruction header, and compute an actual data length of to-be-displayed data in the fourth splitting result, generate a signing request according to the to-be-signed data, a target signature instruction header, the fifth start identification, the third end identification, and the actual data length of the to-be-displayed data, and send the signing request to a request receiving module;

the request receiving module, configured to save the signing request, and wait to receive a signature result obtaining request;

a data determination module, configured to parse the signing request when the signature result obtaining request is received, and determine the to-be-displayed data from the to-be-signed data in a parsing result according to the fifth start identification, the third end identification, and the actual data length of the to-be-displayed data in the parsing result;

a data display module, configured to display the to-be-displayed data; and a signature processing module, configured to generate a private key according to a private key derived address parsed from the signing request, sign the to-be-signed data parsed from the signing request with the private key, and return a signature result.

In a preferred embodiment, for if an operation instruction corresponding to the to-be-signed data is an address freezing operation, the fourth splitting result includes five items of data, i.e., an initiator address, an address data margin, a freezing duration, resource data, and a receiver address, and the identification updating module, the method is specifically configured to:

compute a total length of the initiator address data in the fourth splitting result, and update the fourth start identification based on a tag field of the parameter data, a parameter length field of the parameter data, the total length of the initiator address data, and a tag field of the address data margin to obtain a fifth start identification;

the identification updating module is specifically further configured to:

compute an actual data length of the receiver address in the fourth splitting result, and update the second end identification based on the actual data length of the receiver address to obtain a third end identification;

the request generation module is specifically configured to:

obtain a preset target signature instruction header, and compute an actual data length of the address data margin and an actual data length of the receiver address in the fourth splitting result, generate a signing request based on the to-be-signed data, a target signature instruction header, the fifth start identification, the third end identification, the actual data length of the address data margin, and the actual data length of the receiver address, and send the signing request to the request receiving module;

the data determination module is specifically configured to:

determine the operation instruction corresponding to the to-be-signed data according to the signature result obtaining request when the signature result obtaining request is received, parse the signing request if the operation instruction is an address freezing operation, determine margin data to be displayed from the to-be-signed data in the parsing result according to the fifth start identification and the actual data length of the address data margin in the parsing result, and determine a receiver address to be displayed from the to-be-signed data in the parsing result according to the third end identification and the actual data length of the receiver address in the parsing result; and the data display module is specifically configured to:

display the margin data and the receiver address.

In a preferred embodiment, the request generation module is configured to:

compute an actual data length of the address data margin and an actual data length of the receiver address in the fourth splitting result, and obtain a preset first signature instruction header and a private key derived address, generate a first signing request based on the fifth start identification, the third end identification, the actual data length of the address data margin, the actual data length of the receiver address, the first signature instruction header, and the private key derived address, and send the first signing request to the request receiving module;

the request receiving module is configured to receive and save the first signing request, and return a successful response;

the request generation module is configured to obtain a preset second signature instruction header, and generate a second signing request according to the to-be-signed data and the second signature instruction header, and send the second signing request to the request receiving module;

the request receiving module is configured to receive and save the second signing request, and return a successful response; and the data determination module is specifically configured to:

parse the first signing request and the second signing request separately when the signature result obtaining request is received, determine the operation instruction corresponding to the to-be-signed data according to a parsing result, and determine margin data to be displayed from the parsed to-be-signed data based on the parsed fifth start identification and the parsed actual data length of the address data margin, and determine a receiver address to be displayed from the parsed to-be-signed data based on the parsed third end identification and the parsed actual data length of the receiver address if the operation instruction is an address freezing operation.

In a preferred embodiment, the request generation module is further configured to:

obtain a preset third signature instruction header, generate a public key obtaining request according to the private key derived address and the third signature instruction header, and send the public key obtaining request to a private key generating module;

the private key generating module is configured to:

generate a private key according to a private key derived address parsed from the public key obtaining request, generate a public key according to the private key, and return the public key;

the system further includes a transaction data generation module configured to:

verify the signature result with the public key, if signature verification is successful, generate transaction data based on the signature result, broadcast the transaction data to a blockchain transaction staging pool, and trigger a data structure determination module, otherwise, report an error;

the data structure determination module is configured to extract the transaction data from the blockchain transaction staging pool, and parse the transaction data, determine whether a parsing result conforms to a target data structure, and if yes, trigger a signature verification module, otherwise, report an error; and the signature verification module is configured to verify, by the blockchain node, the signature result in the parsing result, and if signature verification is successful, perform a data circulation operation, otherwise, report an error.

The identification updating module is specifically further configured to:

computing an actual data length of the parameter data in the third splitting result;

the computing the actual data length of the address data margin in the fourth splitting result includes:

computing a total length of five items of data of a tag field of the address data margin, the initiator address, the freezing duration, the resource data, and the receiver address; and performing a difference operation on the actual data length of the parameter data and the total length of the five items of data, and taking the computed difference value as the actual data length of an address data margin in the fourth splitting result.

In a preferred embodiment, the system further includes:

an operation receiving module, configured to determine whether a confirmation operation entered by the user for the displayed margin data and the displayed receiver address is received, and if yes, trigger the signature processing module, otherwise, report an error.

In a preferred embodiment, if an operation instruction corresponding to the to-be-signed data is an address unfreezing operation, the fourth splitting result includes three items of data of an initiator address, a frozen content and a receiver address, and the to-be-displayed data includes the frozen content and the receiver address;

if an operation instruction corresponding to the to-be-signed data is a first data circulation operation, the fourth splitting result includes three items of data of an initiator address, a receiver address, and a circulation amount, and the to-be-displayed data includes the receiver address and the circulation amount;

if an operation instruction corresponding to the to-be-signed data is a second data circulation operation, the fourth splitting result includes four items of data of a resource object name, an initiator address, a receiver address, and the number of resource objects to be circulated, and the to-be-displayed data includes the resource object name, the receiver address, and the number of resource objects to be circulated; and if an operation instruction corresponding to the to-be-signed data is a smart contract triggering operation, the fourth splitting result includes four items of data of an initiator address, a smart contract address, a trigger value, and a data field, and the to-be-displayed data includes the smart contract address and the data field.

In a preferred embodiment, the first function is specifically a signature data processing function, and after the obtaining the first splitting result, the method further includes:

determining whether the first splitting result conforms to a function structure of the signature data processing function, and if yes, triggering the identification updating module, otherwise, reporting an error, and ending the method;

the second function is specifically a contract data processing function, and after the obtaining the second splitting result, the method further includes:

determining whether the second splitting result conforms to a function structure of the contract data processing function, and if yes, triggering the identification updating module, otherwise, reporting an error, and ending the method;

the third function is specifically a contract parameter processing function, and after the obtaining the third splitting result, the method further includes:

determining whether the third splitting result conforms to a function structure of the contract parameter processing function, and if yes, triggering the function determining module, otherwise, reporting an error, and ending the method;

the fourth function is specifically a parameter data processing function, and after the obtaining the fourth splitting result, the method further includes:

determining whether the fourth splitting result conforms to a function structure of the parameter data processing function, and if yes, triggering the identification updating module, otherwise, reporting an error, and ending the method.

In a preferred embodiment, the sending the signing request to the request receiving module includes:

encrypting the signing request by using a stored shared key to obtain a signing request ciphertext; and sending the signing request ciphertext to a hardware device to which the terminal is connected;

the parsing the signing request includes:

decrypting the signing request ciphertext by using the stored shared key, and parsing a signing request plaintext obtained by decrypting.

In a preferred embodiment, the system further includes a shared key generation module configured to:

generate the same long keys respectively through data transfer in Bluetooth pairing;

generate a first public-private key pair, encrypt a first public key in the first public-private key pair by using the long key to obtain a key agreement request, and send the key agreement request to the hardware device;

decrypt the key agreement request by using the long key to obtain a first public key;

generate a second public-private key pair, multiply the first public key by a second private key in the second public-private key pair to obtain a shared key, and save the shared key;

encrypt a second public key in the second public-private key pair by using the long key to obtain a key agreement response, and return the key agreement response to the terminal; and decrypt the key agreement response by using the long key to obtain the second public key, and multiply the second public key by a first private key in the first public-private key pair to obtain a shared key and save the shared key.

In a preferred embodiment, the system further includes a password processing module configured to:

receive a password generating instruction to generate a password, and save the password, and display the password to the user;

receive a to-be-verified password entered by the user, and encrypt the to-be-verified password, generate a password verification instruction, and return the password verification instruction; and decrypt the password verification instruction to obtain a to-be-verified password, verify the to-be-verified password obtained by decrypting with the stored password, return a verification success response and trigger the request generation module if verification passes, otherwise, report an error.

It should be noted that when the system for circulation data in a protocol buffer (PB) format provided by the above embodiment performs the method for parsing circulation data in a protocol buffer (PB) format, only the division of the above functional modules is illustrated as an example, and in practical applications, the above functions may be assigned to different functional modules as needed, i.e., the internal structure of a device may be divided into different functional modules to perform all or part of the above functions. In addition, the system for realizing the effect that what you see is what you sign for the circulation data in the PB format provided by the above embodiment, and the method embodiment for realizing the circulation data in the PB format belong to the same idea, and the implementation process of the system is detailed in the method embodiment, which will not be described in detail here.

The above serial numbers of the embodiments of the present invention are for description only and do not represent the advantages or disadvantages of the embodiments.

In the present invention, the to-be-signed data (the PB format) is processed with the high processing performance of the terminal, and the position and length of data to be displayed on the hardware device are computed and sent to the hardware device together with the to-be-signed data, and the hardware device directly finds to-be-displayed data from the to-be-signed data according to the position and length sent by the terminal and displays the to-be-displayed data on a screen. With the above system, the hardware device can quickly parse the circulation data in the PB format, thereby achieving the effect that what you see is what you sign.

An embodiment of the present invention also provides a computer-readable storage medium having stored thereon a computer program which, when executed by a processor, implements the steps of the method in any one of the above embodiments. The computer-readable storage medium can include, but is not limited to, any type of disk including floppy disks, optical discs, DVDs, CD-ROMs, microdrive, and magneto-optical disks, ROMs, RAMs, EPROMS, EEPROMs, DRAMs, VRAMs, flash memory devices, magnetic or optical cards, nanosystems (including molecular memory ICs), or any type of medium or device suitable for storing instructions and/or data.

An embodiment of the present invention also provides a terminal, including a memory, a processor, and a computer program stored on the memory and executable on the processor, in which the processor, when executing the program, implements the steps of the method in any one of the above embodiments.

An embodiment of the present invention provides a terminal, including: a processor and a memory.

In the embodiments of the present invention, the processor is a control center of a computer system, and may be a processor of a physical machine or a processor of a virtual machine. The processor may include one or more processing cores, such as a 4-core processor, an 8-core processor, and the like. The processor may be implemented in a hardware form of at least one of DSP (Digital Signal Processing), FPGA (Field-Programmable Gate Array), and PLA (Programmable Logic Array). The processor may also include a main processor and a co-processor, in which the main processor is a processor configured to process data in an awake state, also referred to as a CPU (Central Processing Unit); and the co-processor is a low power processor configured to process data in a standby state.

The memory may include one or more computer-readable storage media, which may be non-transitory. The memory may also include a high-speed random access memory and a non-volatile memory, such as one or more magnetic disk storage devices, and flash storage devices. In some embodiments of the present invention, the non-transitory computer-readable storage medium in the memory is configured to store at least one instruction, which is configured to be executed by the processor to implement the method in the embodiment of the present invention.

In some embodiments, the terminal further includes a peripheral interface and at least one peripheral device. The processor, the memory and the peripheral interface may be connected by a bus or signal lines. Each peripheral device may be connected to the peripheral interface through a bus, signal lines, or a circuit board. In particular, the peripheral device includes at least one of a display screen, a camera and an audio circuit.

The peripheral interface can be configured to connect at least one peripheral device related to I/O (Input/Output) to the processor and the memory. In some embodiments of the present invention, the processor, the memory, and the peripheral interface are integrated on the same chip or circuit board; and in some other embodiments of the present invention, any one or both of the processor, the memory, and the peripheral interface may be implemented on a separate chip or circuit board, which is not particularly limited in the embodiments of the present invention.

The display screen is configured to display a UI (User Interface). The UI may include graphics, texts, icons, videos, and any combination thereof. When the display screen is a touch display screen, the display screen also has the ability to collect touch signals on or above the surface of the display screen. The touch signals may be input as control signals to the processor for processing. At this time, the display screen may also be configured to provide virtual buttons and/or virtual keyboards, also referred to as soft buttons and/or soft keyboards. In some embodiments of the present invention, one display screen may be provided, and disposed on a front panel of the terminal; in other embodiments of the present invention, at least two display screens may be provided, and are respectively disposed on different surfaces of the terminal or in a folded design; in still other embodiments of the present invention, the display screen may be a flexible display screen, and is disposed on a curved surface or a folded surface of the terminal. Even, the display screen may also be disposed in a non-rectangular irregular pattern, i.e., a special-shaped screen. The display screen can be manufactured by using a Liquid Crystal Display (LCD), an Organic Light-Emitting Diode (OLED), or the like.

The camera is configured to capture images or videos. Optionally, the camera includes a front camera and a rear camera. Typically, the front camera is disposed on a front panel of a client and the rear camera is disposed on the back of the client. In some embodiments, at least two rear cameras are provided, and are any one of a main camera, a depth-of-field camera, a wide-angle camera, and a long-focus camera, respectively, so as to realize the fusion of the main camera and the depth-of-field camera to realize the background blurring function, and the fusion of the main camera and the wide-angle camera to realize the panoramic shooting and VR (Virtual Reality) shooting function or other fusion shooting functions. In some embodiments of the present invention, the camera may further include a flash lamp. The flash lamp may be a single color temperature flash lamp or a dual color temperature flash lamp. The dual color temperature flash lamp refers to a combination of a warm light flash lamp and a cool light flash lamp, and can be used for light compensation at different color temperatures.

The audio circuit may include a microphone and a speaker. The microphone is configured to collect sound waves of a user and the environment and convert the sound waves into electrical signals that are input to the processor for processing. For the purpose of stereo collection or noise reduction, a plurality of microphones may be provided, and are respectively arranged at different parts of the terminal. The microphone may also be an array microphone or an omnidirectional acquisition type microphone.

A power supply is configured to power the components in the terminal. The power source may be an alternating current power supply, a direct current power supply, a disposable battery, or a rechargeable battery. When the power source includes a rechargeable battery, the rechargeable battery may be a wired rechargeable battery or a wireless rechargeable battery. The wired rechargeable battery is a battery charged by a wired line, and the wireless rechargeable battery is a battery charged by a wireless coil. The rechargeable battery may also be used to support the fast charging technology.

A block diagram of a client structure shown in the embodiments of the present invention does not constitute a limitation on the terminal, and the terminal may include more or fewer components than those shown in the figure, or certain some components, or employ different component arrangements.

In the present invention, the terms "first", "second", etc. are used for descriptive purposes only and are not to be construed as indicating or implying relative importance or order; the term "plurality" refers to two or more, unless expressly specified otherwise. The terms "mounted", "connected", "connection", "fixed", and the like should all be understood broadly, e.g., "connection" may be fixed connection, detachable connection, or integral connection; "connected" may be directly connected or indirectly connected through an intermediate medium. For those skilled in the art, the specific meaning of the above terms in the present invention can be understood according to specific circumstances.

In the description of the present invention, it needs to be understood that an orientation or positional relationship indicated by the terms "upper", "lower" and the like is based on the orientation or positional relationship shown in the drawings, merely for ease of description of the present invention and for simplicity of description, and do not indicate or imply that the system or unit referred to must have a particular orientation, be constructed and operate in a particular orientation, and therefore, are not to be construed as limiting the present invention.

The above description is only specific embodiments of the present invention, but the protection scope of the present invention is not limited thereto, and variations or substitutions that can be easily thought of by those skilled in the art within the technical scope of the present invention should be covered by the protection scope of the present invention. Accordingly, equivalent variations made in accordance with the appended claims of the present invention still fall within the scope of the present invention.

The invention claimed is:

1. A computer implemented method implemented using one or more computer processors for parsing circulation data in a protocol buffer (PB) format, the method comprising the steps of:

S1) receiving, by a terminal, an operation instruction triggered by a user, extracting to-be-signed data from a cache, and setting a first start identification and a first end identification for the to-be-signed data according to a data length of the to-be-signed data;

S2) calling, by the terminal, a preset first function to perform first splitting on the to-be-signed data to obtain a first splitting result, which comprises five items, i.e., a block byte, a block hash, a time-out period, contract data, and a timestamp;

S3) computing, by the terminal, a total length of three items comprising the block byte, the block hash, and the time-out period in the first splitting result, and updating the first start identification based on the total length of the three items to obtain a second start identification;

S4) computing, by the terminal, a total length of the timestamp data in the first splitting result, and updating the first end identification based on the total length of the timestamp data to obtain a second end identification;

S5) calling, by the terminal, a preset second function to perform second splitting on the contract data in the first splitting result to obtain a second splitting result, which comprises two items, i.e., a contract type and a contract parameter;

S6) computing, by the terminal, a total length of the contract type data in the second splitting result, and updating the second start identification based on a tag field of the contract data, a contract length field of the contract data, and the total length of the contract type data to obtain a third start identification;

S7) calling, by the terminal, a preset third function to perform third splitting on the contract parameter in the second splitting result to obtain a third splitting result, which comprises two items, i.e., a parameter type and parameter data;

S8) determining, by the terminal, an actual called function according to the parameter type in the third splitting result, determining whether the actual called function corresponds to the operation instruction, and if yes, executing a step S9, otherwise, reporting an error, then ending the method;

S9) computing, by the terminal, a total length of the parameter type data in the third splitting result, and updating the third start identification based on a tag field of the contract parameter, a parameter length field of the contract parameter and the total length of the parameter type data to obtain a fourth start identification;

S10) obtaining, by the terminal, a fourth function corresponding to the actual called function, and splitting the parameter data in the third splitting result with the fourth function to obtain a fourth splitting result, which comprises at least three items of data;

S11) computing, by the terminal, a data length of first target data in the fourth splitting result, and updating the fourth start identification based on the data length of the first target data to obtain a fifth start identification;

S12) computing, by the terminal, an actual data length of second target data in the fourth splitting result, and updating the second end identification based on the actual data length of the second target data to obtain a third end identification;

S13) obtaining, by the terminal, a preset target signature instruction header, computing an actual data length of to-be-displayed data in the fourth splitting result, generating a signing request according to the to-be-signed data, a target signature instruction header, the fifth start identification, the third end identification, and the actual data length of the to-be-displayed data, and sending the signing request to a hardware device to which the terminal is connected;

S14) saving, by the hardware device, the signing request, and waiting to receive a signature result obtaining request sent by the terminal;

S15) parsing, by the hardware device, the signing request when the signature result obtaining request is received, and determining the to-be-displayed data from the to-be-signed data in a parsing result according to the fifth start identification, the third end identification, and the actual data length of the to-be-displayed data in the parsing result;

S16) displaying, by the hardware device, the to-be-displayed data; and

S17) generating, by the hardware device, a private key according to a private key derived address parsed from the signing request, signing the to-be-signed data parsed from the signing request with the private key, and returning a signature result to the terminal; wherein the parsing of the to-be-signed data and the updates to the start identification and to the end identification ensure integrity of the to-be-signed data prior to signing of the to-be-signed data by the hardware device.

2. The method according to claim 1, wherein if an operation instruction corresponding to the to-be-signed data is an address freezing operation, the fourth splitting result comprises five items, i.e., an initiator address, an address data margin, a freezing duration, resource data, and a receiver address, and the step S11 comprises:

computing, by the terminal, a total length of the initiator address data in the fourth splitting result, and updating the fourth start identification based on a tag field of the parameter data, a parameter length field of the parameter data, the total length of the initiator address data, and a tag field of the address data margin to obtain a fifth start identification;

the step S12 comprises:

computing, by the terminal, an actual data length of the receiver address in the fourth splitting result, and updating the second end identification based on the actual data length of the receiver address to obtain a third end identification;

the step S13 comprises:

obtaining, by the terminal, a preset target signature instruction header, and computing an actual data length of the address data margin and an actual data length of the receiver address in the fourth splitting result, generating a signing request based on the to-be-signed data, a target signature instruction header, the fifth start identification, the third end identification, the actual data length of the address data margin, and the actual data length of the receiver address, and sending the signing request to the hardware device to which the terminal is connected;

the step S15 comprises the following steps:

S151) parsing, by the hardware device, the signing request when the signature result obtaining request is received, determining the operation instruction corresponding to the to-be-signed data according to the parsing result, and if the operation instruction is an address freezing operation, then executing a step S152; and

S152) determining, by the hardware device, margin data to be displayed from the to-be-signed data in the parsing result according to the fifth start identification and the actual data length of the address data margin in the parsing result, and determining the receiver address to be displayed from the to-be-signed data in the parsing result according to the third end identification and the actual data length of the receiver address in the parsing result; and/or the step S16 comprises: displaying, by the hardware device, the margin data and the receiver address.

3. The method according to claim 2, wherein the step S13 comprises the following steps:

S131) computing, by the terminal, an actual data length of the address data margin and an actual data length of the receiver address in the fourth splitting result, and obtaining a preset first signature instruction header and a private key derived address, generating a first signing request based on the fifth start identification, the third end identification, the actual data length of the address data margin, the actual data length of the receiver address, the first signature instruction header, and the private key derived address, and sending the first signing request to the hardware device to which the terminal is connected;

S132) receiving and saving, by the hardware device, the first signing request, and returning a successful response to the terminal;

S133) obtaining, by the terminal, a preset second signature instruction header, generating a second signing request according to the to-be-signed data and the second signature instruction header, and sending the second signing request to the hardware device; and

S134) receiving and saving, by the hardware device, the second signing request, and returning a successful response to the terminal;

the step S14 comprises:

waiting, by the hardware device, to receive a signature result obtaining request sent by the terminal; and/or the step S152 comprises:

parsing, by the hardware device, the first signing request and the second signing request separately, determining margin data to be displayed from the parsed to-be-signed data based on the parsed fifth start identification and the parsed actual data length of the address data margin, and determining a receiver address to be displayed from the to-be-signed data parsed based on the parsed third end identification and the parsed actual data length of the receiver address.

4. The method according to claim 3, wherein prior to the step S17, the method further comprises the following step:

S17') determining, by the hardware device, whether a confirmation operation entered by the user for the displayed margin data and the displayed receiver address is received, and if yes, executing the step S17, otherwise, reporting an error, and ending the method; and/or the executing the step S17 comprises:

generating, by the hardware device, a private key according to a private key derived address parsed from the first signing request, signing to-be-signed data parsed from the second signing request with the private key, and returning a signature result to the terminal.

5. The method according to claim 3, wherein said method further comprises the following steps:

S18) obtaining, by the terminal, a preset third signature instruction header, generating a public key obtaining request according to the private key derived address and the third signature instruction header, and sending the public key obtaining request to the hardware device;

S19) generating, by the hardware device, a private key according to a private key derived address parsed from the public key obtaining request, generating a public key according to the private key, and returning the public key to the terminal;

S20) verifying, by the terminal, the signature result with the public key, if a signature verification is successful, generating transaction data based on the signature result, and broadcasting the transaction data to a blockchain transaction staging pool, then executing a step S21, otherwise, reporting an error, and ending the method;

S21) extracting, by a blockchain node, the transaction data from the blockchain transaction staging pool, parsing the transaction data, and determining whether a parsing result conforms to a target data structure, if yes, executing a step S22, otherwise, reporting an error, and ending the method; and/or

S22) verifying, by the blockchain node, the signature result in the parsing result, and if a signature verification is successful, performing a data circulation operation, otherwise, reporting an error, and ending the method.

6. The method according to claim 5, wherein the step S9 further comprises:

computing, by the terminal, an actual data length of the parameter data in the third splitting result; and/or for computing the actual data length of the address data margin in the fourth splitting result, the method comprises:

computing a total length of five items, i.e., a tag field of the address data margin, the initiator address, the freezing duration, the resource data, and the receiver address; and/or performing a difference operation on the actual data length of the parameter data and the total length of the five items of data, and taking a computed difference value as the actual data length of the address data margin in the fourth splitting result.

7. The method according to claim 1, wherein if an operation instruction corresponding to the to-be-signed data is an address unfreezing operation, the fourth splitting result comprises three items, i.e., an initiator address, a frozen content, and a receiver address, and the to-be-displayed data comprises the frozen content and the receiver address;

if an operation instruction corresponding to the to-be-signed data is a first data circulation operation, the fourth splitting result comprises three items, i.e., an initiator address, a receiver address, and a circulation amount, and the to-be-displayed data comprises the receiver address and the circulation amount;

if an operation instruction corresponding to the to-be-signed data is a second data circulation operation, the fourth splitting result comprises four items, i.e., a resource object name, an initiator address, a receiver address, and a number of resource objects to be circulated, and the to-be-displayed data comprises the resource object name, the receiver address, and the number of resource objects to be circulated; and/or if an operation instruction corresponding to the to-be-signed data is a smart contract triggering operation, the fourth splitting result comprises four items, i.e., an initiator address, a smart contract address, a trigger value, and a data field, and the to-be-displayed data comprises the smart contract address and the data field.

8. The method according to claim 1, wherein the first function is specifically a signature data processing function, and after the obtaining the first splitting result, the method further comprises:

determining whether the first splitting result conforms to a function structure of the signature data processing function, and if yes, executing the step S3, otherwise, reporting an error, and ending the method;

the second function is specifically a contract data processing function, and after the obtaining the second splitting result, the method further comprises:

determining whether the second splitting result conforms to a function structure of the contract data processing function, and if yes, executing the step S6, otherwise, reporting an error, and ending the method;

the third function is specifically a contract parameter processing function, and after the obtaining the third splitting result, the method further comprises:

determining whether the third splitting result conforms to a function structure of the contract parameter processing function, and if yes, executing the step S8, otherwise, reporting an error, and ending the method; and/or the fourth function is specifically a parameter data processing function, and after the obtaining the fourth splitting result, the method further comprises:

determining whether the fourth splitting result conforms to a function structure of the parameter data processing function, and if yes, executing the step S11, otherwise, reporting an error, and ending the method.

9. The method according to claim 1, wherein for sending the signing request to the hardware device to which the terminal is connected, the method comprises:

encrypting the signing request by using a stored shared key to obtain a signing request ciphertext; and sending the signing request ciphertext to the hardware device to which the terminal is connected; and/or for parsing, by the hardware device, the signing request, the method comprises:

decrypting, by the hardware device, the signing request ciphertext by using the stored shared key, and parsing a signing request plaintext obtained by decrypting.

10. The method according to claim 9, wherein, prior to the step S1, said method further comprises the following steps:

S1-1) generating, by the terminal and the hardware device, a same long key respectively through data transfer in Bluetooth pairing;

S1-2) generating, by the terminal, a first public-private key pair, encrypting a first public key in the first public-private key pair by using the long key to obtain a key agreement request, and sending the key agreement request to the hardware device;

S1-3) decrypting, by the hardware device, the key agreement request by using the long key to obtain a first public key;

S1-4) generating, by the hardware device, a second public-private key pair, multiplying the first public key by a second private key in the second public-private key pair to obtain a shared key, and saving the shared key;

S1-5) encrypting, by the hardware device, a second public key in the second public-private key pair by using the long key to obtain a key agreement response, and returning the key agreement response to the terminal; and S1-6) decrypting, by the terminal, the key agreement response by using the long key to obtain the second public key, multiplying the second public key by a first private key in the first public-private key pair to obtain a shared key, and saving the shared key.

11. The method according to claim 1, wherein prior to the step S13, the method further comprises the following steps:

S13-1) receiving, by a hardware device, a password generating instruction sent by the terminal to generate a password, saving the password, and displaying the password to the user;

S13-2) receiving, by the terminal, a to-be-verified password entered by the user, encrypting the to-be-verified password, generating a password verification instruction, and sending the password verification instruction to the hardware device; and S13-3) decrypting, by the hardware device, the password verification instruction to obtain a to-be-verified password, verifying the to-be-verified password obtained by decrypting with the password stored, and if a verification passes, returning a verification success response to the terminal, then executing the step S13, otherwise, reporting an error, and ending the method.

12. A non-transitory computer-readable storage medium, having a computer program stored thereon, wherein, when executed by a processor, the computer program implements the steps of the method according to claim 1.

13. A terminal comprising a memory, a processor, and a computer program stored on the memory and executable on the processor, wherein the processor, when executing the program, implements the steps of the method according to claim 1.

14. A system for parsing circulation data in a protocol buffer (PB) format, comprising:

A one or more processors and a memory;

a first module for performing an identification setting, configured to receive an operation instruction triggered by a user, extract to-be-signed data from a cache, and set a first start identification and a first end identification for the to-be-signed data according to a data length of the to-be-signed data;

a second module for performing data splitting, configured to call a preset first function to perform first splitting on the to-be-signed data to obtain a first splitting result, in which the first splitting result comprises five items, a block byte, a block hash, a time-out period, contract data, and a timestamp;

a third module for performing identification updating, configured to compute a total length of three items, the block byte, the block hash, and the time-out period in the first splitting result, and update the first start identification based on the total length of the three items of data to obtain a second start identification; in which the third module for performing identification updating is further configured to compute a total length of the timestamp data in the first splitting result, and update the first end identification based on the total length of the timestamp data to obtain a second end identification;

the second module for performing data splitting is further configured to call a preset second function to perform second splitting on the contract data in the first splitting result to obtain a second splitting result, in which the second splitting result comprises two items, i.e., a contract type and a contract parameter;

the third module for performing identification updating is further configured to compute a total length of the contract type data in the second splitting result, and update the second start identification based on a tag field of the contract data, a contract length field of the contract data, and the total length of the contract type data to obtain a third start identification; and the second module for performing data splitting is further configured to call a preset third function to perform third splitting on the contract parameter in the second splitting result to obtain a third splitting result, in which the third splitting result comprises two items, a parameter type and parameter data;

a fourth module for performing function determining, configured to determine an actual called function according to the parameter type in the third splitting result, and determine whether the actual called function corresponds to the operation instruction, if yes, trigger the third module for performing identification updating, otherwise, report an error, then closing the system; in which the third module for performing identification updating is further configured to compute a total length of the parameter type data in the third splitting result, and update the third start identification based on a tag field of the contract parameter, a parameter length field of the contract parameter and the total length of the parameter type data to obtain a fourth start identification;

the second module for performing data splitting is further configured to obtain a fourth function corresponding to the actual called function, and split the parameter data in the third splitting result with the fourth function to obtain a fourth splitting result, in which the fourth splitting result comprises at least three items of data;

the third module for performing identification updating is further configured to compute a data length of first target data in the fourth splitting result, and update the fourth start identification based on the data length of the first target data to obtain a fifth start identification; and the third module for performing identification updating is further configured to compute an actual data length of second target data in the fourth splitting result, and update the second end identification based on the actual data length of the second target data to obtain a third end identification;

a fifth module for performing request generation, configured to obtain a preset target signature instruction header, and compute an actual data length of to-be-displayed data in the fourth splitting result, generate a signing request according to the to-be-signed data, a target signature instruction header, the fifth start identification, the third end identification, and the actual data length of the to-be-displayed data, and send the signing request to a sixth module for performing request receiving;

the sixth module for performing request receiving, configured to save the signing request, and wait to receive a signature result obtaining request;

a seventh module for performing data determination, configured to parse the signing request when the signature result obtaining request is received, and determine the to-be-displayed data from the to-be-signed data in a parsing result according to the fifth start identification, the third end identification, and the actual data length of the to-be-displayed data in the parsing result;

an eighth module for performing data display, configured to display the to-be-displayed data; and a ninth module for performing signature processing, configured to generate a private key according to a private key derived address parsed from the signing request, sign the to-be-signed data parsed from the signing request with the private key, and return a signature result;

wherein the parsing of the to-be-signed data and the updates to the start identification and to the end identification ensure integrity of the to-be-signed data prior to signing of the to-be-signed data by the hardware device and the modules are implemented by the one or more processors and the memory.

* * * * *